(12) United States Patent
Chuang et al.

(10) Patent No.: US 10,397,588 B2
(45) Date of Patent: Aug. 27, 2019

(54) METHOD AND APPARATUS FOR RESOURCE SHARING BETWEEN INTRA BLOCK COPY MODE AND INTER PREDICTION MODE IN VIDEO CODING SYSTEMS

(71) Applicant: MEDIATEK INC., Hsinchu (TW)

(72) Inventors: Tzu-Der Chuang, Zhubei (TW); Ping Chao, Taipei (TW); Ching-Yeh Chen, Taipei (TW); Yu-Chen Sun, Keelung (TW); Chih-Ming Wang, Zhubei (TW); Chia-Yun Cheng, Zhubei (TW); Han-Liang Chou, Hsinchu County (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/578,184

(22) PCT Filed: Jun. 3, 2016

(86) PCT No.: PCT/CN2016/084651
§ 371 (c)(1),
(2) Date: Nov. 29, 2017

(87) PCT Pub. No.: WO2016/192662
PCT Pub. Date: Dec. 8, 2016

(65) Prior Publication Data
US 2018/0103260 A1    Apr. 12, 2018

Related U.S. Application Data

(60) Provisional application No. 62/170,267, filed on Jun. 3, 2015, provisional application No. 62/213,254, filed on Sep. 2, 2015.

(51) Int. Cl.
*H04N 19/186* (2014.01)
*H04N 19/51* (2014.01)
(Continued)

(52) U.S. Cl.
CPC ......... *H04N 19/186* (2014.11); *H04N 19/176* (2014.11); *H04N 19/423* (2014.11);
(Continued)

(58) Field of Classification Search
None
See application file for complete search history.

(56) References Cited

U.S. PATENT DOCUMENTS 5,687,216 A * 11/1997 Svensson .......... H04M 1/72547
379/357.02
5,699,128 A * 12/1997 Hayashi ............... H04N 19/577
348/699

(Continued)

FOREIGN PATENT DOCUMENTS

CN   103503456 A   1/2014
EP   1 919 221 A1  5/2008
(Continued)

OTHER PUBLICATIONS

International Search Report dated Jul. 26, 2016, issued in application No. PCT/CN2016/084651.
(Continued)

*Primary Examiner* — Peter D Le
(74) *Attorney, Agent, or Firm* — Oblon, McClelland, Maier & Neustadt, L.L.P.

(57) ABSTRACT

A method and apparatus of sharing an on-chip buffer or cache memory for a video coding system using coding modes including Inter prediction mode or Intra Block Copy (IntraBC) mode are disclosed. At least partial pre-deblocking reconstructed video data of a current picture is stored in an on-chip buffer or cache memory. If the current block is coded using IntraBC mode, the pre-deblocking reconstructed video data of the current picture stored in the on-chip buffer or cache memory are used to derive IntraBC
(Continued)

prediction for the current block. In some embodiments, if the current block is coded using Inter prediction mode, Inter reference video data from the previous picture stored in the on-chip buffer or cache memory are used to derive Inter prediction for the current block. In another embodiment, the motion compensation/motion estimation unit is shared by the two modes.

17 Claims, 8 Drawing Sheets

(51) Int. Cl.
    *H04N 19/593*     (2014.01)
    *H04N 19/423*     (2014.01)
    *H04N 19/433*     (2014.01)
    *H04N 19/176*     (2014.01)
    *H04N 19/70*     (2014.01)

(52) U.S. Cl.
    CPC ........... *H04N 19/433* (2014.11); *H04N 19/51* (2014.11); *H04N 19/593* (2014.11); *H04N 19/70* (2014.11)

(56) References Cited

U.S. PATENT DOCUMENTS

| | | | |
|---|---|---|---|
| 9,712,817 B1 * | 7/2017 | Cismas | H04N 19/0009 |
| 2003/0117461 A1 | 6/2003 | Park et al. | |
| 2004/0246266 A1 * | 12/2004 | MacInnis | H04N 19/186 |
| | | | 345/589 |
| 2010/0287333 A1 * | 11/2010 | Lee | G06F 12/0873 |
| | | | 711/103 |
| 2012/0177112 A1 | 7/2012 | Guo et al. | |
| 2014/0286442 A1 * | 9/2014 | Kim | H04N 19/82 |
| | | | 375/240.29 |
| 2014/0301465 A1 * | 10/2014 | Kwon | H04N 19/503 |
| | | | 375/240.16 |
| 2014/0376634 A1 * | 12/2014 | Guo | H04N 19/52 |
| | | | 375/240.16 |
| 2015/0049813 A1 | 2/2015 | Tabatabai et al. | |
| 2015/0071357 A1 | 3/2015 | Pang et al. | |
| 2015/0296213 A1 * | 10/2015 | Hellman | H04N 19/44 |
| | | | 375/240.01 |

FOREIGN PATENT DOCUMENTS

| | | |
|---|---|---|
| WO | 2015/052273 A1 | 4/2015 |
| WO | 2015/054811 A1 | 4/2015 |
| WO | 2015/057438 A1 | 4/2015 |

OTHER PUBLICATIONS

Extended European Search Report dated Jan. 14, 2019 in Patent Application No. 16802585.6, 7 pages.

European Office Action dated Jan. 31, 2019 in Patent Application No. 16802585.6, 1 page.

Jun Xu, et al., "On Intra Block RExt" Sony Electronics Inc., Sony Corporation, 15th Meeting, Joint Collaborative Team on Video Coding (JCT-VC) of ITU-T SG 16 WP 3 and ISO/IEC JTC 1/SC 29/WG 11, JCTVC-O0232rl, XP030115285, Oct. 23, 2013, pp. 1-12.

Rajan Joshi, et al., "High Efficiency Video Coding (HEVC) Screen Content Coding: Draft 3" 20th Meeting, Joint Collaborative Team on Video Coding (JCT-VC) of ITU-T SG 16 WP 3 and ISO/IEC JTC 1/SC 29/WG 11, JCTVC-T1005, XP055321224, Feb. 1, 2015, 567 Pages.

Bin Li, et al., "Non-SCCE1: Unification of Intra BC and Inter Modes" Microsoft Corp., 18th Meeting, Joint Collaborative Team on Video Coding (JCT-VC) of ITU-T SG.16 WP 3 and ISO/IEC JTC 1/SC 29/WG 11, JCTVC-R0100 rl, XP030116357, Jun. 29, 2014, pp. 1-28.

\* cited by examiner

METHOD AND APPARATUS FOR RESOURCE SHARING BETWEEN INTRA BLOCK COPY MODE AND INTER PREDICTION MODE IN VIDEO CODING SYSTEMS

CROSS REFERENCE TO RELATED APPLICATIONS

The present invention claims priority to U.S. Provisional Patent Application, Ser. No. 62/170,267, filed on Jun. 3, 2015 and U.S. Provisional Patent Application, Ser. No. 62/213,254, filed on Sep. 2, 2015. The U.S. Provisional Patent Applications are hereby incorporated by reference in their entireties.

FIELD OF THE INVENTION

The present invention relates to video coding using Intra Block Copy (IntraBC) mode. In particular, the present invent relates to resource sharing between the Intra block copy mode and the Inter prediction mode in video coding systems.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include screen content coding (SCC). Due to specific characteristics of screen contents, coding tools have been developed and demonstrate significant gains in coding efficiency. Among them, the colour index coding (a.k.a. major colour based coding) techniques represent block of pixels using indices to the palette (major colours), and encode the palette and the indices by exploiting spatial redundancy. While the total number of possible colour combinations is huge, the number of colours in an area of picture is usually very limited for typical screen contents. Therefore, the colour index coding becomes very effective for screen content materials. Related key colour index coding techniques are briefly reviewed as follows.

During the Course of Screen Content Coding (SCC) development, various video coding tools have been described, including the "Intra picture block copy" (In-traBC) technique. The IntraBC technique was first disclosed in JCTVC-M0350 (Budagavi et al., *AHG8: Video coding using Intra motion compensation*, Joint Collaborative Team on Video Coding (JCT-VC) of ITU-T SG16 WP3 and ISO/IEC JTC 1/SC 29/WG11 13th Meeting: Incheon, KR, 18-26 Apr. 2013, Document: JCTVC-M0350). An example according to JCTVC-M0350 is shown in FIG. 1, where a current coding unit (CU, 110) is coded using Intra MC (motion compensation). The Intra MC is also named as Intra Block Copy (IntraBC). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named motion vector (MV) or block vector (BV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process.

In JCTVC-M0350, the IntraBC is different from the motion compensation used for Inter prediction in at least the following areas:

BVs are restricted to be 1-D for IntraBC (i.e., either horizontal or vertical) while Inter prediction uses 2-D motion estimation.

Binarization is fixed length for IntraBC while Inter prediction uses exponential-Golomb.

IntraBC introduces a new syntax element to signal whether the BV is horizontal or vertical.

Based on JCTVC-M0350, some modifications are disclosed by Pang, et al., in *Non-RCE3: Intra Motion Compensation with 2-D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the IntraBC is extended to support 2-D MVs, so that both vertical and horizontal MV components can be non-zero at the same time. This provides more flexibility to IntraBC than the original approach, where the MV is restricted to be strictly horizontal or vertical.

In JCTVC-R0309 (Pang, et al., "Non-SCCE1: Combination of JCTVC-R0185 and JCTVC-R0203", JCTVC-R0309, Joint Collaborative Team on Video Coding (JCT-VC) of ITU-T SG 16 WP 3 and ISO/IEC JTC 1/SC 29/WG 11, 18th Meeting: Sapporo, JP, July 2014), the neighbouring BVs and coded BVs are used as BV predictor (BVP). The BV predictor is derived similar to the AMVP (advanced motion vector prediction) scheme in HEVC. The predictor candidate list is constructed by first accessing in order the spatial neighbouring blocks $a_1$ (220) and $b_1$ (230) of a current block (210) as shown in FIG. 2. If any of the spatial neighbours doesn't have a block vector, the last two coded BVs are used as substitute block vectors to fill the block vector candidate list so that the list contain two different entries. The substitute block vectors are initialized with (−2*CU_width, 0) and (−CU_width, 0), where CU_width is the width of the CU. To avoid the line buffer, the above BV out of current CTU is considered unavailable. The last two coded BVs are reset to (0, 0) for each CTU to prevent the data dependency.

In HEVC, Merge candidates are derived from spatial/temporal neighbour blocks for the current coded block in an Inter coded slice. A merge_flag is used to signal whether the current block is merged into one of its candidates. If yes, another index is used to signal which of the candidates is used for Merge mode. For example, if candidate block $a_1$ in FIG. 2 is signalled as the candidate to be used, then the current block will share the same motion vector and reference picture as those in block $a_1$.

If any Merge candidate is not available (e.g. non-existing or not coded in Inter mode), additional candidates are inserted into the candidate list. If the Merge candidate list is still not full after inserting the additional candidates, zero motion vector with reference index (i.e., refIdx) equal to 0 will be used to fill all the empty candidates.

Two types of additional candidates can be inserted:
1. Combined bi-predictive Merge candidate (candidate type 1)
2. Zero vector Merge/AMVP candidate (candidate type 2)

The type-2 additional candidates are inserted after the type-1 additional candidates.

For the type-1 candidate, combined bi-predictive Merge candidates are generated by combining original Merge candidates. In particular, two original candidates, which have mvL0 (the motion vector in list 0) and refIdxL0 (the reference picture index in list 0), or mvL1 (the motion vector in list 1) and refIdxL1 (the reference picture index in list 1), are used to generate bi-predictive Merge candidates.

For the type-2 candidate, zero-vector Merge/AMVP candidates are generated by combining zero vectors and reference index which can be referred. If zero-vector candidates are not duplicated, it is added to Merge/AMVP candidate set.

In SCM-2.0 (Joshi, et al., *Screen content coding test model 2* (*SCM 2*), Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R1014), coding of block vector difference is modified to use one context-coded bin for coding each vector component. Methods to further improve the coding efficiency and to enable unification of BVD and MVD coding have also been disclosed in the literature.

In SCM-3.0 (Joshi, et al., *Screen content coding test model* 3(*SCM 3*), Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S1014), a ladder shaped IntraBC search range constraint is adopted, as shown in FIG. 3, where the blocks with cross-lined background indicate the ladder shape IntraBC search range and block 310 corresponds to the current CTU. For an IntraBC block in current CTU, the available search area is constrained to the CTUs with dotted background and the reconstructed blocks in the current CTU.

BRIEF SUMMARY OF THE INVENTION

A method and apparatus for configuring an on-chip buffer or cache memory in a video coding system using coding modes including an Intra Block Copy (IntraBC) mode are disclosed. According to this method, at least partial pre-deblocking reconstructed video data of a current picture are stored in the on-chip buffer or cache memory. When the video coding system uses coding modes including an Inter prediction mode, at least partial Inter reference video data from a previous picture are also stored in the on-chip buffer or cache memory. At least partial Inter reference video data from a previous picture are stored in an on-chip buffer or cache memory in this case. If the current block is coded using IntraBC mode, the pre-deblocking reconstructed video data of the current picture stored in the on-chip buffer or cache memory are used to derive IntraBC prediction for the current block. In some embodiments, if the current block is coded using Inter prediction mode, the Inter reference video data from the previous picture stored in the on-chip buffer or cache memory are used to derive Inter prediction for the current block. The partial Inter reference video data from the previous picture can be pre-fetched into the on-chip buffer or cache memory from a decoded picture buffer based on an off-chip memory. In one embodiment, second partial pre-deblocking reconstructed video data of the current picture can be stored in an off-chip memory.

In order to reduce system bandwidth, the pre-deblocking reconstructed video data of the current picture can be directly outputted from a motion compensation or motion estimation (MC/ME) unit into the on-chip buffer or cache memory. Therefore, for IntraBC encoding or decoding another block in a following coding tree unit (CTU) of the current picture, the system can determine whether required pre-deblocking reconstructed video data is in the on-chip buffer or cache memory. If so, the system can read the required pre-deblocking reconstructed video data from the on-chip buffer or cache memory. Otherwise, the system will read the required pre-deblocking reconstructed video data from an off-chip memory. When the on-chip buffer or cache memory is full or is almost full, at least some pre-deblocking reconstructed video data in the on-chip buffer or cache memory is flushed. The flushed data may correspond to stored data being staying for a longest time, being least-recently used, being far away from the current block in geometry position, or being most-unlikely used in future.

In one embodiment, the on-chip buffer or cache memory is reconfigured to store reconstructed video data belonging the pre-deblocking reconstructed video data of the current picture in one configuration and to store reconstructed video data belonging to said at least partial Inter reference video data from the previous picture in another configuration. If the on-chip buffer or cache memory comprises N cache lines, the N cache lines can be configured into M cache line groups with each cache line group consisting of one to (N−M+1) cache lines, and where N and M are positive integers and $1 < M \leq N$. The line groups can be individually and dynamically configured to store reference frame data in the Inter prediction mode or pre-deblocking data in the IntraBC mode. A flag or an address range can be used to identify whether the stored data in the line group are the reference frame data in the Inter prediction mode or the pre-deblocking data in the IntraBC mode. If the total number of cache line group for one mode of the Inter prediction mode and the IntraBC mode exceeds a threshold, at least one cache line group is flushed to release resource for another mode. The threshold can be determined adaptively according to a coding condition. For example, the threshold is set to zero for the Inter prediction mode if blocks encoded or decoded are in an Intra slice.

According to another method of the present invention, the motion estimation (ME) unit used for the Inter prediction mode in an encoder side or a motion compensation (MC) unit used for the Inter prediction mode in a decoder side to perform pixel reconstruction in the IntraBC mode. The motion estimation unit or the motion compensation unit generates a prediction block using reference pixels in a previous picture and a motion vector. For the IntraBC mode, the motion estimation unit or the motion compensation unit uses the previous pre-deblocking reconstruction video data in the current picture as the reference pixels and the block vector as the motion vector to generate the prediction block. The MC/ME sharing between the Inter prediction mode and the IntraBC mode can be combined with the on-chip buffer or cache memory sharing.

When IntraBC is applied to non-444 colour video data, the chroma component has to be interpolated horizontally and vertically. However, the interpolation filtering requires data from a neighbouring block. The data dependency will cause bubble cycles in the processing pipeline. According to yet another method of the present invention, spatial interpolation is applied to first-colour chroma blocks and second-colour chroma blocks by interleaving the first-colour chroma blocks and the second-colour chroma blocks. Furthermore, reconstruction process is applied to luma blocks, the first-colour chroma blocks and the second-colour chroma blocks by splitting each luma block into two half luma blocks and processing each half luma block between one first-colour chroma block and one second-colour chroma block.

DETAILED DESCRIPTION OF THE INVENTION

Figure 1:
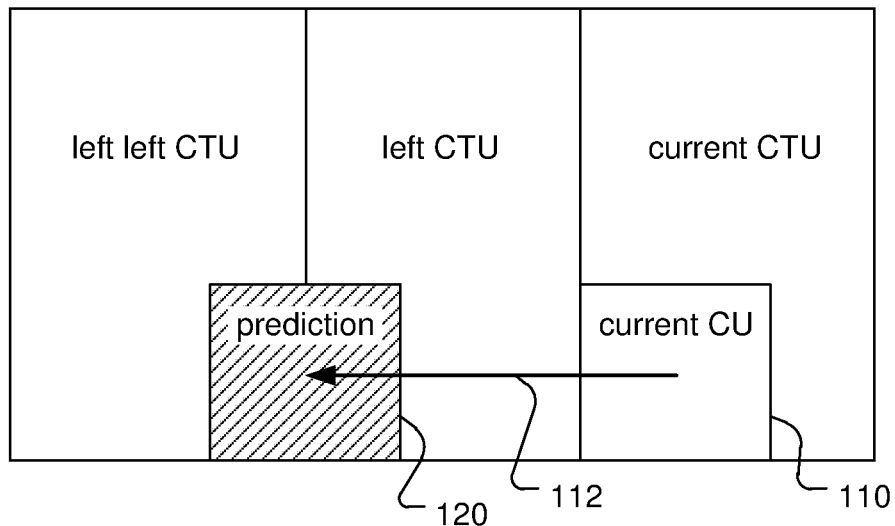
FIG. 1 illustrates an example of Intra Block Copy (IntraBC), where the block vector is restricted to the horizontal direction.
Figure 2:
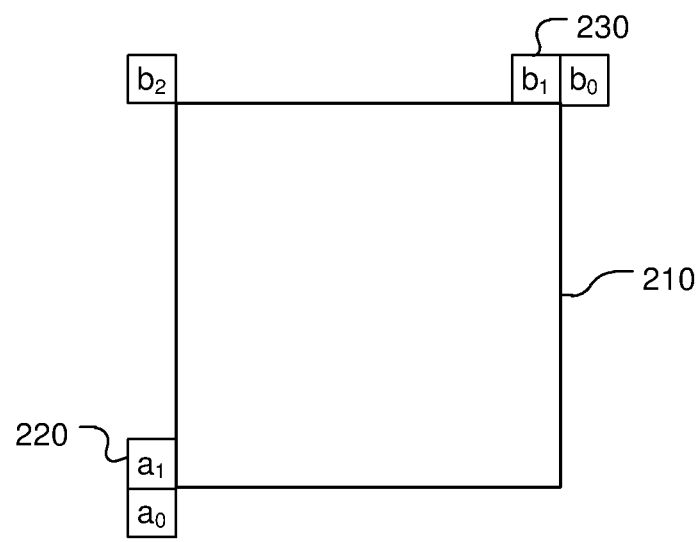
FIG. 2 illustrates an example of constructing motion vector predictor candidate list based on motion vectors of spatial neighbouring blocks.
Figure 3:
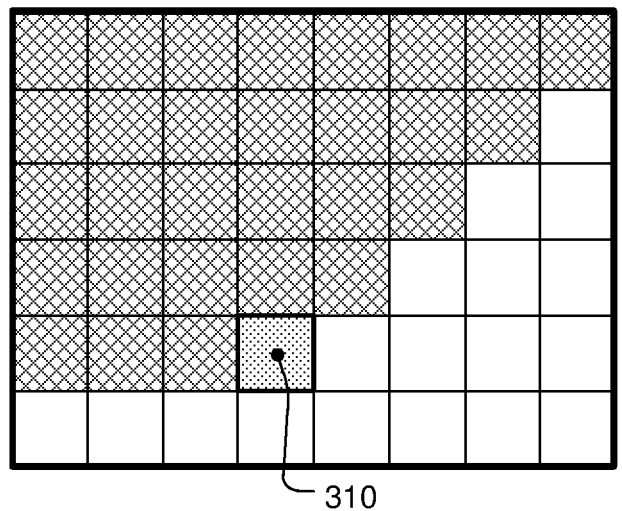
FIG. 3 illustrates an example of a ladder shaped IntraBC search range according to existing HEVC SCC (high efficiency video coding—screen content coding) specification.

The following description is of the best-contemplated mode of carrying out the invention. This description is made for the purpose of illustrating the general principles of the invention and should not be taken in a limiting sense. The scope of the invention is best determined by reference to the appended claims.

Share the On-Chip Cache Buffer for Inter Mode and IntraBC Mode

In video encoding design, an on-chip buffer or cache is usually used to store the search range data corresponding to the texture of reference frames. In SCC (screen content coding), the pre-deblocking reconstructed texture of current picture is required for IntraBC prediction. The pre-deblocking reconstructed video data (i.e., texture) of current picture is usually stored in the same place as the reference pictures. Due to the relatively large storage requirement, the reference pictures are usually stored in the off-chip memory, such as the DRAM (dynamic random access memory). However, in the encoder side, it usually has one or more on-chip buffers or caches to store the partial data of reference pictures for motion estimation in the Inter prediction mode. In the present invention, on-chip buffer or cache sharing for both Inter prediction and IntraBC prediction is disclosed. The on-chip buffer or cache not only stores the partial data of the reference pictures, but also stores the pre-deblocking reconstructed texture of the current picture. Therefore, Inter motion estimation and IntraBC block matching can access the same buffer or cache for the required data.

In one embodiment, part of the pre-deblocking reconstructed texture of the current picture is stored in off-chip buffer while part of the pre-deblocking reconstructed texture of current picture is stored in the on-chip buffer or cache. The on-chip buffer or cache is shared between Inter prediction and IntraBC prediction.

In another embodiment, part of the pre-deblocking reconstructed texture of the current picture is stored in the off-chip buffer while part of the pre-deblocking reconstructed texture of current picture is stored in the on-chip buffer or cache. However, the on-chip buffer or cache is not shared for Inter prediction. In this case, the data in the on-chip buffer or cache can be referred by the CUs in the current frame.

Similar to the Merge mode for Inter prediction, possible candidate BVs for the current PU can be derived from the information of the neighbouring blocks according to one embodiment of the present invention. The possible BV (block vector) candidates can be the BVs of the left, below-left, top, top-left, top-right neighbouring blocks. The possible BV candidates can also be the BVs that are derived according to Merge candidate derivation. Before encoding the current PU, the reference data of the IntraBC prediction of the current PU can be pre-fetched into the on-chip buffer or cache. In some other embodiments, at least partial Inter reference video data from the previous picture can be pre-fetched into the on-chip buffer or cache memory from a decoded picture buffer based on an off-chip memory.

Pre-Deblocking Data Caching Method

For the IntraBC mode, video encoder and decoder need to store the pre-deblocking data in the buffer, which is usually implemented as an external memory. It will result in increased memory bandwidth consumption in order to access the pre-deblocking data stored in the external memory. In order to reduce the memory bandwidth, a pre-deblocking data caching method may comprise one or more of the following steps or features:
1. Output reconstructed data (pre-deblocking data) from MC (motion compensation)/ME (motion estimation) to the de-blocking filter module.
2. Store at least a part of pre-deblocking data in the internal buffer (e.g. SRAM (static random access memory) or cache) directly from MC/ME.
   a) The pre-deblocking data may also be stored into external buffer for long-term use. At the encoder side, the pre-deblocking data may not be stored in the external buffer or just a part of pre-deblocking data is stored in the external buffer for saving the memory bandwidth.
3. When encoding/decoding IntraBC mode in the following CTU of the same frame, check if the required pre-deblocking data is in the internal buffer.
   a) If the required pre-deblocking data exist in internal buffer, read the data from the internal buffer.
   b) If the required pre-deblocking data does not exist, read the data from the external buffer.
4. Flush the pre-deblocking data in the internal buffer in the following conditions:
   a) The buffer is full or almost full, or
   b) The data is stored for the longest time, or the data is least-recently used, or the data is most-unlikely to be used in the future.

Figure 4:
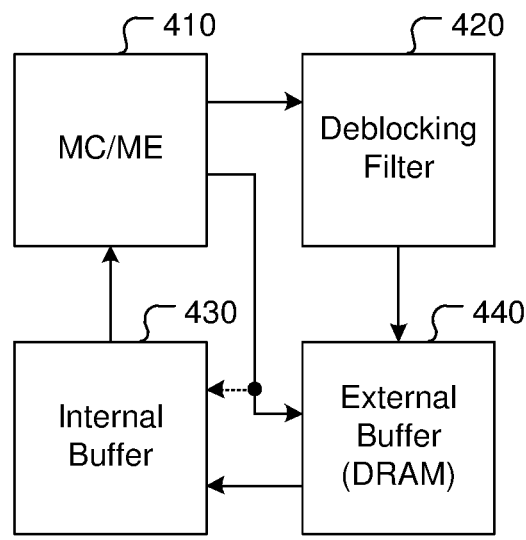
FIG. 4 illustrates an exemplary system block diagram associated with the pre-deblocking data caching method, where only the related system blocks in a coding system are shown.

FIG. 4 illustrates an exemplary system block diagram associated with the pre-deblocking data caching method, where only the related system blocks in a coding system are shown. The main system blocks comprise a MC/ME unit 410 (motion estimation/motion compensation unit), a deblocking filter unit 420, an internal buffer 430 and an external buffer 440. The internal buffer 430 is implemented using SRAM (static random access memory) or cache device to support required high access speed. On the other hand, the external buffer may be based on DRAM (dynamic random access memory) for low-cost implement of large storage. In some embodiments, if the buffer is full or substantially full or not may be determined according to a predetermined strategy (for example, a threshold).

Shared Pre-Deblocking Data Caching Method

The pre-deblocking data caching method can be implemented as a dedicated cache or cache-like memory, which usually has a high cost. In order to further reduce the cost, a shared pre-deblocking data caching method is disclosed.

It is observed that data buffering may be different for different coding scenarios. In one scenario, the video coding system may not need to buffer the pre-deblocking data. In another scenario, the video coding system may need to buffer pre-deblocking data more than the reference frame data for motion compensation. A reconfigurable cache that can store both the pre-deblocking data and the reference frame data corresponding to de-blocked and/or filtered data may substantially increase cache utilization and reduce cost. The data caching method may comprise one or more of the following steps or features:
1. Use the cache system to simultaneously store pre-deblocking data and reference frame data corresponding to de-blocked and/or filtered data, where at least a part of the cache resource can be reconfigured to store the reference frame data or the pre-deblocking data.
2. Configure the cache system with N cache line, where the N cache lines are configured into M groups, each group has 1 to (N−M+1) cache lines, M and N are positive integers, and $1<M\leq N$.
3. Individually and dynamically configure at least one group of cache lines as a reference-mode for storing the reference frame data or pre-deblocking-mode for storing the pre-deblocking data.
   a. Mode configuration: use a tag or address range to label a cache line as the reference-mode or pre-deblocking-mode
4. Use a flush method to control the resource usage of reference-mode or pre-deblocking-mode to increase cache hit rate.
   a. Limit the number of cache lines for one of the two modes. For example, when the occupied cache line number exceed a threshold, flush a line to release resource to another mode
   b. Determine the resource limitation adaptively according to coding scenario. For example, when an Intra slice is encoded or decoded, the number of cache lines for reference-mode is limited to be 0.

Figure 5:
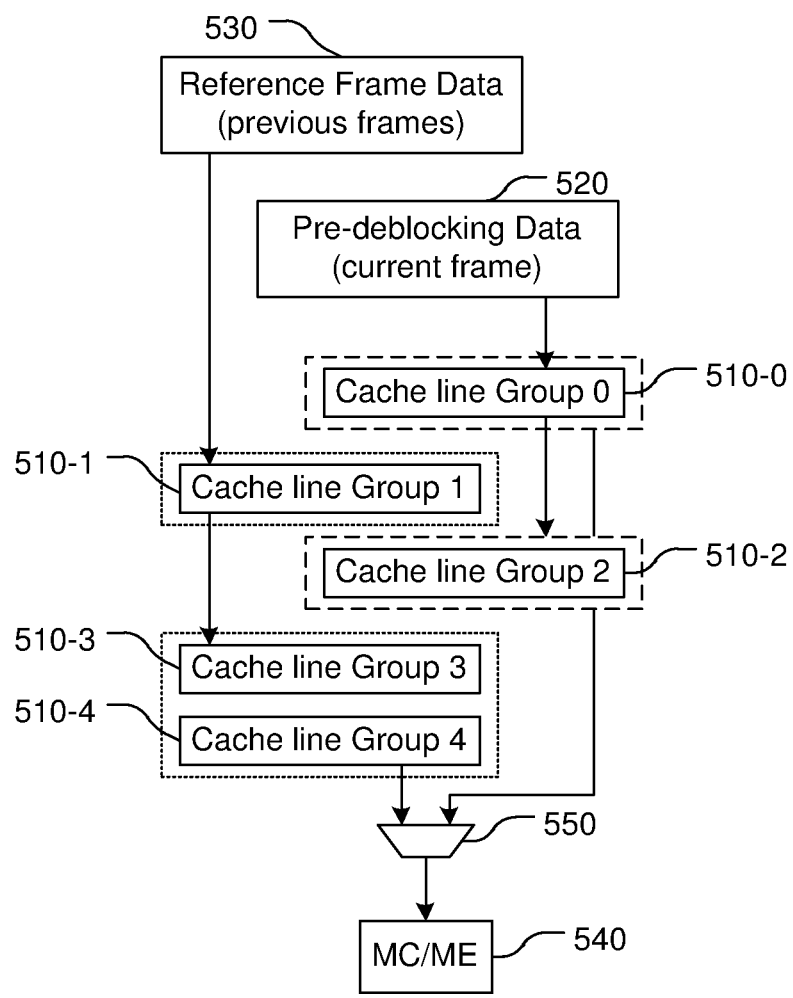
FIG. 5 illustrates an example of block diagram for a coding system incorporating an embodiment of shared pre-deblocking data and Inter frame reference data caching method.

FIG. 5 illustrates an example of configuring the cache memory in a coding system incorporating an embodiment of shared pre-deblocking data caching method. The cache memory (510-0 through 510-4) is used for buffering pre-deblocking data (520) of the current frame or the reference frame data (530) of previous frames. In other words, the cache memory (510-0 through 510-4) is shared by the pre-deblocking data and the reference frame data. The pre-deblocking data is used for IntraBC prediction and the reference frame data from previous frames are used for Inter prediction. The cache memory is configured into cache line groups so that each cache line group can be allocated individually and adaptively to store the pre-deblocking data or the reference frame data. In the example of FIG. 5, there are five cache line groups, where cache line group 0 (510-0) and cache line group 2 (510-2) are allocated for storing the pre-deblocking data. On the other hand, cache line group 1 (510-1) and cache line groups 3 and 4 (510-3 and 510-4) are allocated for storing the reference frame data. Each cache line group consists of one or more cache lines. FIG. 5 illustrates an example that the IntraBC process and the Inter prediction process share the same MC/ME unit 540 (motion estimation/motion compensation unit) via a selector 550. Nevertheless, individual processing units may be used for IntraBC prediction and Inter prediction. Since the cache memory allocation is performed individually and adaptively, the allocation for the cache line groups may be changed at the next decision instance, such as next prediction unit (PU), coding unit (CU) or coding tree unit (CTU).

Figure 6A:
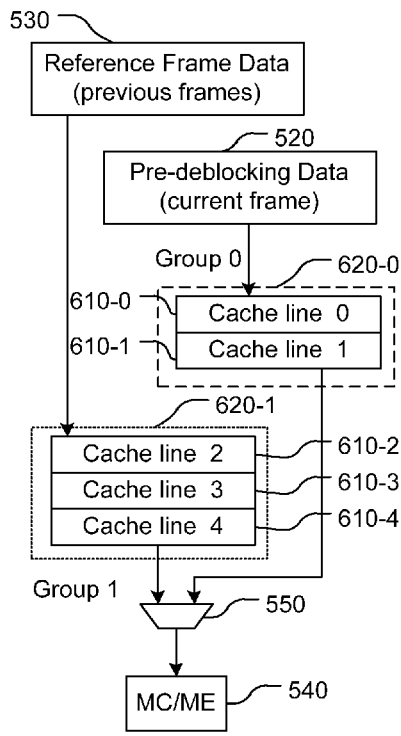
FIG. 6A illustrates an example of configuring shared on-chip memory for storing the pre-deblocking data and Inter frame reference data according to one embodiment of the present invention.

Cache memory arrangement—Example 1. An example according to the shared pre-deblocking data caching method is shown as follows:
1. N=5, M=2, as shown in FIG. 6A. In other words, there are five cache lines (610-0 to 610-4) that are configured into two cache line groups (620-0 and 620-1).
2. Each group has a pre-defined number of cache lines.
   a. In this case, group 0 (620-0) has two cache lines and group 1 (620-1) has three cache lines
3. Each one of the two cache line groups can be individually configured as the reference-mode for storing the reference frame data or the pre-deblocking-mode for storing the pre-deblocking data.
   a. For the Inter slice type without the intraBC mode, configure both cache line groups as the reference-mode to fully utilize the cache for MC/ME.
   b. For the Intra slice type, configure both cache line groups as the pre-deblocking-mode to fully utilize cache for the intraBC mode.

4. The two cache line groups may be implemented as two separated buffers/SRAMs.

Figure 6B:
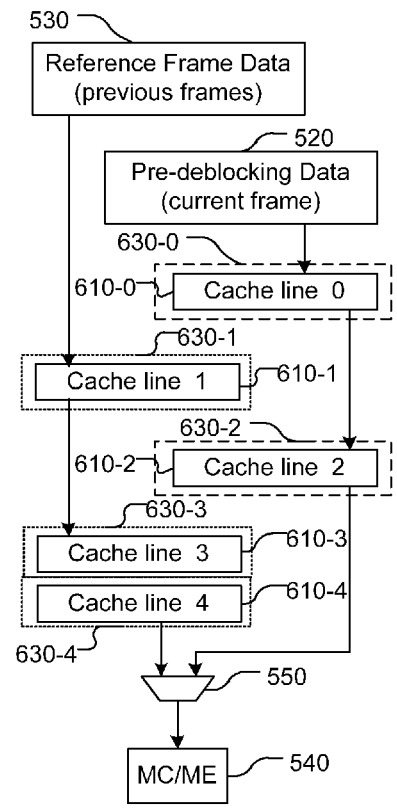
FIG. 6B illustrates another example of configuring shared on-chip memory for storing the pre-deblocking data and Inter frame reference data according to one embodiment of the present invention.

Cache memory arrangement—Example 2. An example according to the shared pre-deblocking data caching method is shown as follows:
1. N=M=5, as shown in FIG. 6B. In other words, the five cache lines (610-0 to 610-4) that are configured into five cache line groups (630-0 to 630-4) with one cache line in each group.
2. Each line in a group can be individually and dynamically configured as a reference-mode for storing reference frame data or pre-deblocking-mode for storing pre-deblocking data.
3. Use a tag or memory address range to label a cache line as the reference-mode or the pre-deblocking-mode.
4. Use LRU (least recently used) flush method for both the reference-mode cache line and the pre-deblocking-mode cache line.

The cache update can be based on the data geometry relationship. In SCM, the left neighbouring CTUs and upper CTUs are usually used as the IntraBC predictors. In decoder side, the left M CTUs and above N CTUs of pre-deblocking samples can be stored in the cache or pre-fetched from the cache. In the cache, the samples that are not in the left M CTUs and above N CTUs can be replaced by other data.

Reuse the MC HW for IntraBC Picture

In SCM-4.0, IntraBC will use BV and the reference pixels to perform compensation for the target block. The operation is the exactly the same operations as MC (motion compensation) process that uses MV and the reference pixels in previous frames. Therefore, the processor, electronic circuitry or other hardware used for the MC process can be reused to perform IntraBC compensation. In decoder side, the IntraBC compensation can be performed in the pixel reconstruction stage. In encoder side, the ME hardware can also be reused or shared between the IntraBC mode and the Inter prediction mode.

Chroma IBC MC Schedule

Figure 7:
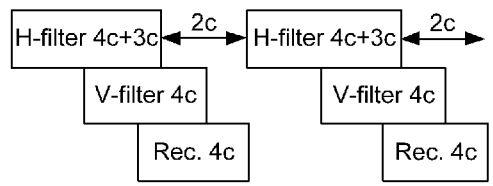
FIG. 7 illustrates an exemplary timing relationship of processing pipeline corresponding to chroma horizontal filtering, vertical filtering and reconstruction in the IntraBC mode, where two bubble cycles are needed between the horizontal processing of two consecutive blocks of the same chroma component.

In SCM-5.1 (Joshi, et al., *Screen content coding test model 3(SCM 3)*, Joint Collaborative Team on Video Coding (JCT-VC) of ITU-T SG 16 WP 3 and ISO/IEC JTC 1/SC 29/WG 11, 21st Meeting: Warsaw, PL, 19-26 Jun. 2015, Document: JCTVC-U1014), the chroma interpolation is required in non-444 format. The interpolation may require bubble cycles if the input and output data has data dependency. The bubble cycle is a NOP cycle (i.e., idle cycle) added to pipeline processing to resolve data dependency issue. For example, bubble cycles may be required if the reconstructed data in the previous PU/CU is used as the predictors for the current PU/CU. In this case, the 2D separable interpolation filter is used according to HEVC-SCC specification. As shown in FIG. 7, the horizontal filter is first applied and the vertical filter is applied to get the interpolated predictors after 4 rows are filtered (i.e., 4-tap filter used for the chroma component). Since additional horizontal lines (i.e., 3 rows) are needed to perform the vertical filtering, the total horizontal filtering will require 7 cycles (i.e., 4c+3c). One additional cycle is required to generate the reconstruction pixels by adding the residual. As shown in FIG. 7, two bubble cycles are required.

Figure 8:
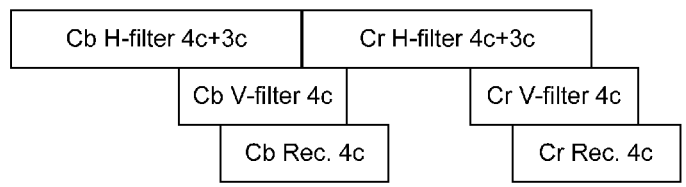
FIG. 8 illustrates an exemplary timing relationship of processing pipeline corresponding to a colour-component interleaving method to eliminate the bubble cycles according to an embodiment of the present invention.
Figure 9:
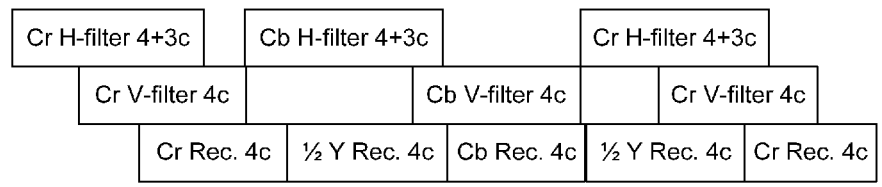
FIG. 9 illustrates another exemplary timing relationship of processing pipeline corresponding to a colour-component interleaving method to eliminate the bubble cycles according to an embodiment of the present invention.

In order to reduce the bubble cycles, the colour-component interleaving method of the present invention can be applied, as shown in FIG. 8, where a block corresponding to a first chroma component (i.e., Cb) is processed followed by another block corresponding to a second chroma component (i.e., Cr). In other words, the two colour blocks (i.e., Cb blocks and Cr blocks) are interleaved for the IntraBC process. In another embodiment, the luma component can be separate into two parts. One part can be inserted between Cb and Cr and another part is inserted between Cr and Cb to reduce the bubble cycle, as shown in FIG. 9.

Figure 10:
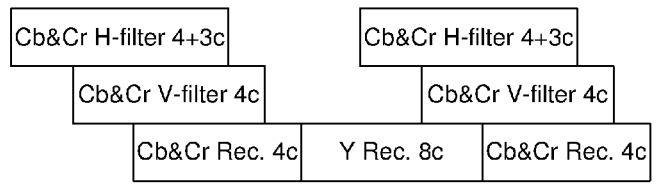
FIG. 10 illustrates yet another exemplary timing relationship of processing pipeline corresponding to a colour-component interleaving method to eliminate the bubble cycles according to an embodiment of the present invention.

In another embodiment, the Cb and Cr components can be processed in parallel to reduce the required bubble cycles, as shown in FIG. 10.

Figure 11:
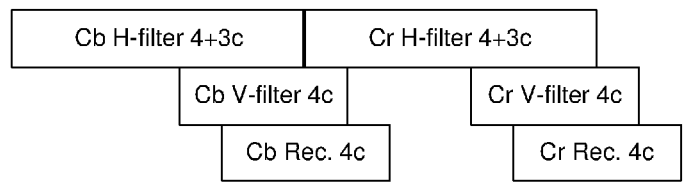
FIG. 11 illustrates another exemplary timing relationship of processing pipeline corresponding to a colour-component interleaving method for the fractional block vector (BV) case.

In HEVC-SCC, if the block vector (BV) is fractional (i.e., the BV pointing to a fractional position), then 2-pixel margin near the available pixel boundaries is considered as unavailable area according to one embodiment of the present invention. Therefore, the output data of previous CU will not be used for the current CU interpolation during the first 2 cycles. The bubble cycle can be hidden, as shown in FIG. 11.

Figure 12:
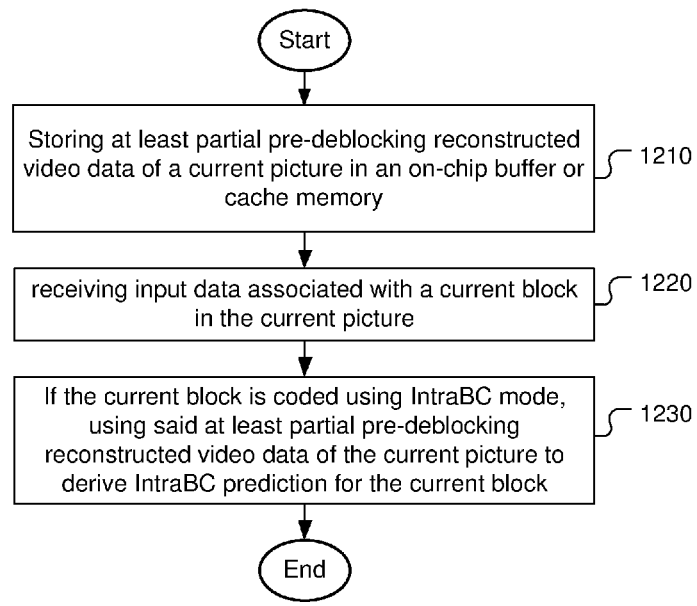
FIG. 12 illustrates a flowchart of an exemplary coding system using coding modes including IntraBC mode and Inter prediction mode according to an embodiment of the present invention, where the on-chip buffer or cache memory is shared by the Inter prediction mode and the IntraBC mode.

FIG. 12 illustrates a flowchart of an exemplary coding system using coding modes including IntraBC mode and Inter prediction mode according to an embodiment of the present invention, where the on-chip buffer or cache memory is shared by the Inter prediction mode and the IntraBC mode. At least partial pre-deblocking reconstructed video data of a current picture are stored in an on-chip buffer or cache memory as shown in step 1210. Input data associated with a current block in the current picture are received in step 1220. In the encoder side, the input data correspond to the pixel data to be encoded using the Inter prediction mode or the IntraBC mode. At the decoder side, the input data correspond to the encoded pixel data to be decoded using the Inter prediction mode or the IntraBC mode. If the current block is coded using IntraBC mode, said at least partial pre-deblocking reconstructed video data of the current picture are used to derive IntraBC prediction for the current block in step 1230.

Figure 13:
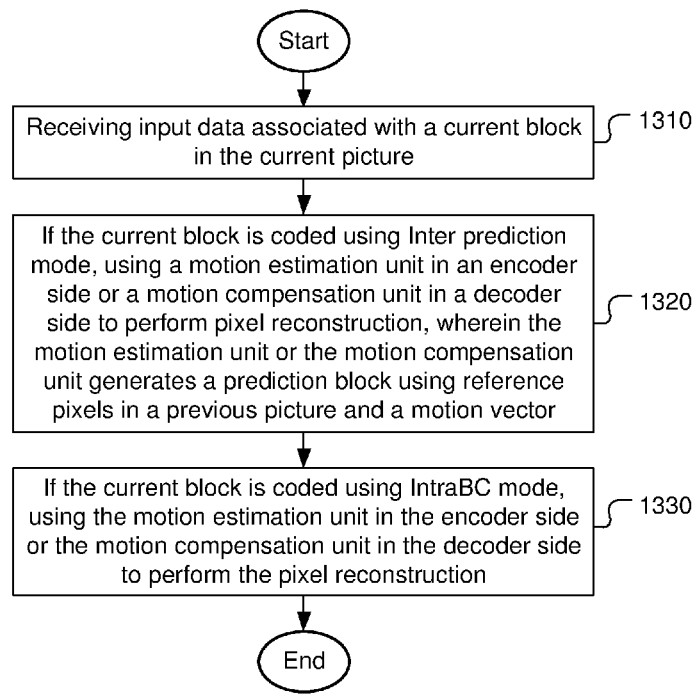
FIG. 13 illustrates a flowchart of an exemplary coding system using coding modes including IntraBC mode and Inter prediction mode according to an embodiment of the present invention, where the motion compensation (MC) unit or the motion estimation (ME) unit is shared by the Inter prediction mode and the IntraBC mode.

FIG. 13 illustrates a flowchart of an exemplary coding system using coding modes including IntraBC mode and Inter prediction mode according to an embodiment of the present invention, where the motion compensation (MC) unit or the motion estimation (ME) unit is shared by the Inter prediction mode and the IntraBC mode. Input data associated with a current block in the current picture are received in step 1310. In the encoder side, the input data correspond to the pixel data to be encoded using the Inter prediction mode or the IntraBC mode. At the decoder side, the input data correspond to the encoded pixel data to be decoded using the Inter prediction mode or the IntraBC mode. If the current block is coded using Inter prediction mode, a motion estimation unit in an encoder side or a motion compensation unit in a decoder side is used to perform pixel reconstruction in step 1320, where the motion estimation unit or the motion compensation unit generates a prediction block using reference pixels in a previous picture and a motion vector. If the current block is coded using IntraBC mode, the motion estimation unit in the encoder side or the motion compensation unit in the decoder side is used to perform the pixel reconstruction in step 1330.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of configuring an on-chip buffer or cache memory for a video coding system using coding modes including an Intra Block Copy (IntraBC) mode and an Inter prediction mode, comprising:
storing at least partial Inter reference video data from a previous picture in the on-chip buffer or cache memory;
storing at least partial pre-deblocking reconstructed video data of a current picture in the on-chip buffer or cache memory;
receiving input data associated with a current block in the current picture;
determining which one of the coding modes including the IntraBC mode and the Inter prediction mode was used to code the current block;
when it is determined that the current block is coded using the IntraBC mode, using the at least partial pre-deblocking reconstructed video data of the current picture stored in the on-chip buffer or cache memory to derive IntraBC prediction for the current block; and
when it is determined that the current block is coded using the Inter prediction mode, using the at least partial Inter reference video data from the previous picture to derive Inter prediction for the current block,
wherein a total cache line number of at least one cache line group of the on-chip buffer or cache memory is compared to a threshold for determining whether to flush at least one cache line of the at least one cache line group, and the threshold is set to zero for the Inter prediction mode if blocks encoded or decoded are in an Intra slice.

2. The method of claim 1, further comprising storing second partial pre-deblocking reconstructed video data of the current picture in an off-chip memory.

3. The method of claim 1, further comprising storing the at least partial Inter reference video data from the previous picture in the on-chip buffer or cache memory.

4. The method of claim 3, wherein said at least partial Inter reference video data from the previous picture is pre-fetched into the on-chip buffer or cache memory from a decoded picture buffer based on an off-chip memory.

5. The method of claim 3, wherein said at least partial pre-deblocking reconstructed video data of the current picture are directly outputted from a motion compensation, motion estimation (MC/ME), or reconstruction unit into the on-chip buffer or cache memory.

6. The method of claim 5, further comprising determining whether required pre-deblocking reconstructed video data for IntraBC encoding or decoding another block in a following coding tree unit (CTU) of the current picture is in the on-chip buffer or cache memory, and reading the required pre-deblocking reconstructed video data from the on-chip buffer or cache memory if the required pre-deblocking reconstructed video data exists in the on-chip buffer or cache memory, and reading the required pre-deblocking reconstructed video data from an off-chip memory if the required pre-deblocking reconstructed video data does not exist in the on-chip buffer or cache memory.

7. The method of claim 5, wherein at least some pre-deblocking reconstructed video data in the on-chip buffer or cache memory is flushed when the on-chip buffer or cache memory is full or is substantially full.

8. The method of claim 7, wherein said at least some pre-deblocking reconstructed video data to be flushed corresponds to stored data being staying for a longest time, being least-recently used, being far away from the current block in geometry position, or being most-unlikely used in future.

9. The method of claim 3, wherein at least a part of the on-chip buffer or cache memory is reconfigured to store reconstructed video data belonging to said at least partial pre-deblocking reconstructed video data of the current picture in one configuration and to store reconstructed video data belonging to said at least partial Inter reference video data from the previous picture in another configuration.

10. The method of claim 3, wherein the on-chip buffer or cache memory comprises N cache lines that are configured into M cache line groups with each cache line group consisting of one to (N−M+1) cache lines, and wherein N and M are positive integers and 1<M≤N.

11. The method of claim 10, wherein at least one cache line group is individually and dynamically configured to store reference frame data in the Inter prediction mode or pre-deblocking data in the IntraBC mode.

12. The method of claim 11, wherein a flag or an address range is used to identify whether stored data in said at least one cache line group are the reference frame data for the Inter prediction mode or the pre-deblocking data for the IntraBC mode.

13. The method of claim 10, wherein if the total cache line number of the at least one cache line group is for one mode of the Inter prediction mode and the IntraBC mode, and the at least one cache line of the cache line group is flushed to release resource for another mode.

14. The method of claim 13, wherein the threshold is determined adaptively according to a coding condition.

15. The method of claim 3, further comprising using a motion estimation unit used for the Inter prediction mode in an encoder side or a motion compensation unit used for the Inter prediction mode in a decoder side to perform pixel reconstruction in the IntraBC mode, wherein the motion estimation unit or the motion compensation unit generates a prediction block using reference pixels in a previous picture and a motion vector.

16. The method of claim 15, wherein previous pre-deblocking reconstructed video data in the current picture are used as reference pixels and a block vector is used as the motion vector to generate the prediction block for the IntraBC mode.

17. A video encoder or decoder using coding modes including an Intra Block Copy (IntraBC) mode and an Inter prediction mode, comprising one or more electronic circuits or a processor configured to:
store at least partial Inter reference video data from a previous picture in the on-chip buffer or cache memory;
store at least partial pre-deblocking reconstructed video data of a current picture in an on-chip buffer or cache memory;
receive input data associated with a current block in the current picture;
determine which one of the coding modes including the IntraBC mode and the Inter prediction mode was used to code the current block;
when it is determined that the current block is coded using the IntraBC mode, use the at least partial pre-deblocking reconstructed video data of the current picture stored in the on-chip buffer or cache memory to derive IntraBC prediction for the current block; and
when it is determined that the current block is coded using the Inter prediction mode, use the at least partial Inter reference video data from the previous picture to derive Inter prediction for the current block,
wherein a total cache line number of at least one cache line group of the on-chip buffer or cache memory is compared to a threshold for determining whether to flush at least one cache line of the at least one cache line group, and the threshold is set to zero for the Inter prediction mode if blocks encoded or decoded are in an Intra slice.

* * * * *